US010572919B2

(12) United States Patent
Avidor et al.

(10) Patent No.: US 10,572,919 B2
(45) Date of Patent: Feb. 25, 2020

(54) DYNAMIC INVENTORY ENHANCEMENT (71) Applicant: Cymbio Digital Ltd., Tel-Aviv (IL)

(72) Inventors: Roy Avidor, Tel-Aviv (IL); Mor Lavi, Kiryat-Ono (IL); Gilad Zirkel, Tel-Aviv (IL)

(73) Assignee: Cymbio Digital Ltd., Tel-Aviv (IL)

(*) Notice: Subject to any disclaimer, the term of this patent is extended or adjusted under 35 U.S.C. 154(b) by 366 days.

(21) Appl. No.: 15/460,259

(22) Filed: Mar. 16, 2017

(65) Prior Publication Data

US 2017/0287027 A1 Oct. 5, 2017

Related U.S. Application Data (60) Provisional application No. 62/314,514, filed on Mar. 29, 2016.

(51) Int. Cl.
*G06Q 30/06* (2012.01)
*H04L 29/08* (2006.01)
*G06Q 40/04* (2012.01)
(Continued)

(52) U.S. Cl.
CPC ..... *G06Q 30/0603* (2013.01); *G06Q 30/0641* (2013.01); *H04L 67/02* (2013.01);
(Continued)

(58) Field of Classification Search
CPC ............ G06Q 30/06; G06Q 30/0603; G06Q 30/0641; G06Q 40/04; G06Q 10/087; H04L 67/02; H04L 67/2838
(Continued)

(56) References Cited

U.S. PATENT DOCUMENTS 8,515,825 B1 * 8/2013 Ross, Jr. ............... G06Q 30/06
705/26.41
8,799,569 B2 * 8/2014 Harris ................... G06F 16/176
711/113
(Continued)

FOREIGN PATENT DOCUMENTS

WO WO-2015082760 A1 * 6/2015 ............ H04L 67/02

OTHER PUBLICATIONS

Ren, Xiaoai, "Multiple Case Studies of Public Library Systems in New York"; 2012; Dissertation at Albany, State University of New York, published 2012; extracted from ProQuest Dialog on Aug. 12, 2019.*
(Continued)

*Primary Examiner* — Yogesh C Garg (57) ABSTRACT

A computer implemented method of enhancing a response to a query for an item at a website, comprising:
(a) Obtaining, at a website server, a request from a client terminal for retrieving information of a requested item.
(b) Detecting presence or absence of the requested item in a local catalog of the visited website.
(c) Presenting, in case of presence, a first presentation of the requested item at a GUI displayed at client terminal.
(d) Issuing, in case of absence, a search query for the requested item in a shared catalog comprising a plurality of offered items available from another websites.
(e) Receiving a response from the shared catalog. The response comprises result item(s) from the plurality of offered items corresponding to the requested item.
(f) Presenting a second presentation of the result item(s) at the GUI. The first presentation and the second presentation share a common visual format.

21 Claims, 5 Drawing Sheets (51) Int. Cl.
*G06Q 10/08* (2012.01)
(52) U.S. Cl.
CPC ....... *H04L 67/2838* (2013.01); *G06Q 10/087* (2013.01); *G06Q 40/04* (2013.01)
(58) Field of Classification Search
USPC ................................ 705/26.1, 27.1, 28, 28.1
See application file for complete search history.

(56) References Cited

U.S. PATENT DOCUMENTS

| | | | | |
|---|---|---|---|---|
| 2004/0267630 A1* | 12/2004 | Au | ......................... | G06Q 30/06 705/80 |
| 2015/0088845 A1* | 3/2015 | Zhao | ...................... | G06Q 30/00 707/706 |
| 2015/0088847 A1* | 3/2015 | Nelson | ............... | G06Q 30/0277 707/706 |
| 2015/0287124 A1* | 10/2015 | Ogrinz | ............... | G06Q 30/0635 705/26.81 |
| 2016/0048535 A1* | 2/2016 | Shaw | .................. | G06F 16/9537 707/724 |
| 2016/0292207 A1* | 10/2016 | Watanabe | ............. | G06F 16/958 |

OTHER PUBLICATIONS

Flavian, Carlos; Gurrea, Raquel; Orús, Carlos; : Web design: a key factor for the website success; 2009; published in Journal of Systems and Information Technology; Bingley vol. 11, Iss. 2, (2009): 168-184; extracted from Dialog Solutions on Dec. 9, 2019.*

* cited by examiner

DYNAMIC INVENTORY ENHANCEMENT

RELATED APPLICATION

This application claims the benefit of priority under 35 USC 119(e) of U.S. Provisional Patent Application No. 62/314,514 filed on Mar. 29, 2016, the contents of which are incorporated herein by reference in their entirety.

BACKGROUND

The present invention, in some embodiments thereof, relates to enhancing response to item queries at a website, and, more specifically, but not exclusively, to enhancing response to item queries at a website by expanding the search for the item in a shared catalog comprising a plurality of offered items from a plurality of websites.

Online shopping and trading has already gained a significant share of the overall shopping volume and it is rapidly growing.

Extensive resources, for example, advertisement, campaigns, public relations (PR) and the like are invested by online traders to attract potential buyers to visit their online stores, i.e. online trading websites.

While the heavy investment may bring the potential buyers to visit the online trading website(s), only a fraction of these visitors actually make a purchase and/or a deal. The conversion rate of potential buyers to actual clients may be as low as 2% implying of an extreme inefficiency in converting potential clients to actual clients.

The low conversion rate may be the result of a plurality of reasons, for example, limited products variety at the online trading website(s), transaction terms the buyer may find not attractive, language barriers and the like.

The low conversion rate may affect large online traders having a relatively high product variety and/or may be well known for the products they offer. However, small online traders may suffer to a greater degree as they typically carry a lower product variety due limited resources, for example, stock cost, storage space, depreciation and the like. Moreover, the small online traders may not be well branded for leading the potential buyers who are looking for a specific product and/or product category to visit an online trading website which does not offer the requested product and/or category.

SUMMARY

According to some embodiments of the present invention there is provided a computer implemented method of enhancing a response to a query for an item at a website, comprising:

Obtaining, at a server hosting a visited website, a request from a client terminal for retrieving information of a requested item.

Detecting a presence or an absence of the requested item in a local catalog of the visited website.

Presenting, in case of the presence, a first presentation of the requested item at a graphical user interface displayed on a display of the client terminal.

Issuing, in case of the absence, a search query for the requested item in a shared catalog comprising a plurality of offered items available from one or more another websites.

Receiving a response from the shared catalog, the response comprises one or more result items from the plurality of offered items which correspond to the requested item.

Presenting a second presentation of the one or more result items at the graphical user interface, the first presentation and the second presentation share a common visual format.

The visited website is a member selected from a group comprising: a trading website accessible in the internet, a trading application executed at the client terminal and a physical store having an online local catalog accessible to the shared catalog.

The obtaining of the request includes intercepting the request prior to reaching the local catalog.

The obtaining of the request includes intercepting a response from the local catalog to the request.

The search query is directed to retrieve the one or more result items from a subset the plurality of offered items. The subset includes offered items which are offered by one or more another websites which is of a class similar to the class of the visited website.

Optionally, the search query is issued to one or more product feeds.

The one or more result items are injected into the local catalog.

Optionally, one or more attributes of the one or more result items are negotiated with one or more another website providing the one or more result items. The attributes may be item price and/or revenue division percentage.

The presentation of the one or more result items includes one or more characteristics of the one or more result item. The characteristics are members selected from a group consisting of: a description, a type, a category, an attribute, a price, an availability, a delivery term, a return policy and a warranty term.

Optionally, the one or more result items are sorted for the presentation. The sorting expresses a relevancy order of the one or more result items compared to the requested item.

The sorting is based on a match score assigned to each of the one or more result items by analyzing a description of each result item compared to a description of the requested item.

The sorting is based on a product ranking assigned to each of the one or more result items according to one or more characteristics of each result item.

The sorting is based on a trader ranking assigned to each of a plurality of websites offering the one or more result items.

Optionally, the presentation includes one or more alternative items to the requested item.

According to some embodiments of the present invention there is provided a system of enhancing a response to a query for an item at a website, comprising a program store storing a code and one or more processors at a server hosting a visited website coupled to the program store for executing the stored code, the code comprising:

Code instructions to obtain a request from a client terminal for retrieving information of a requested item.

Code instructions to detect presence or absence of the requested item in a local catalog of the visited website.

Code instructions to present, in case of presence, a first presentation of the requested item at a GUI displayed on a display of the client terminal.

Code instructions to issue, in case of absence, a search query for the requested item in a shared catalog comprising a plurality of offered items available from one or more another websites.

Code instructions to receive a response from the shared catalog. The response comprises one or more result items from the plurality of offered items which correspond to the requested item.

Code instructions to present a second presentation of the one or more result items at the GUI. The first presentation and the second presentation share a common visual format.

The shared catalog is hosted by a server accessible by the server hosting the visited website over the Internet.

The shared catalog is distributed among a plurality of hosts accessible by the server hosting the visited website over the Internet.

According to some embodiments of the present invention there is provided a computer implemented method of constructing a shared catalog, comprising:

Registering each of a plurality of websites at a shared catalog service.

Importing a list of a plurality of available items offered by each of the plurality of websites.

Importing one or more characteristics of each of the plurality of available items.

Classifying the each website in one of a plurality of trading categories.

Updating the shared catalog with the list of available items, the one or more characteristics of each of the plurality of available items and the trading category of each of the plurality of websites.

Optionally, a semantic analysis is performed to extract one or more semantic attributes of at least some of the plurality of available items.

Optionally, the shared catalog is updated following a change detected in one or more of the plurality of websites. The change includes one or more of: an update to the list and an update to the one or more characteristic of one or more of the available items.

According to some embodiments of the present invention there is provided a system of constructing a shared catalog, comprising a program store storing a code and one or more processors of one or more servers hosting a shared catalog service coupled to the program store for executing the stored code, the code comprising;

Code instructions to register each of a plurality of websites at the shared catalog service;

Code instructions to import a list of a plurality of available items offered by each of the plurality of websites;

Code instructions to import one or more characteristics of each of the plurality of available items;

Code instructions to classify the each website in one of a plurality of trading categories;

Code instructions to update the shared catalog with the list of available items. The one or more characteristics of each of the plurality of available items and the trading category of the website.

The shared catalog is hosted by a server accessible by each of the plurality of websites over the Internet.

The shared catalog is distributed among a plurality of hosts accessible by each of the plurality of websites over the Internet.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to enhancing response to item queries at a website, and, more specifically, but not exclusively, to enhancing response to item queries at a website by expanding the search for the item in a shared catalog comprising a plurality of offered items from a plurality of websites.

According to some embodiments of the present invention, there are provided methods and systems for creating a shared catalog for sharing items, for example, commodities and/or services offerings among a plurality of online trading websites, trading applications and/or stores (physical stores) and using the shared catalog to offer potential buyers their requested items for purchase. A user, i.e. a potential buyer browsing the Internet and/or using a trading application in search of a requested item may visit one of the online trading websites. Optionally, the user may visit a physical store having an online local catalog listing the inventory of the store and an access to a shard catalog. In case the requested item is available at the visited trading website, the purchasing session may be followed regularly. However, when the requested item is not found in a local catalog listing the inventory of items offered by the visited trading website, the requested item is searched for in a shared catalog which comprises and/or maps a plurality of local catalogs which list the inventories of the other (third party) trading websites.

One or more result items which correspond to the requested item may be found in the shared catalog. The result items may be retrieved by the visited trading website and presented to the user. Optionally, when no exact match is found in the shared catalog for the requested item, one or more alternative items may be suggested and/or presented to the user. Providing the result items from the third party trading websites may lead to a successful purchasing session in which the user purchases the result item(s) even if they are not available by the visited trading website. Following a successful purchasing session, the visited trading website and the third party trading website(s) may share the revenues obtained though the purchasing session.

Optionally, the search query is directed to one or more product feeds. The product feed is a list and/or a catalog of inventory containing descriptive fields on each product available in the inventory. The descriptive fields may be explored to search for the requested item in the product feeds.

The presentation of the result items at the visited trading website is uniform and/or identical for result items which are available from the local catalog as well as for result items which are available from the other (third party) trading websites. The presentation is adapted to provide a uniform and/or homogenous appearance of the result items with respect to one or more presentation aspects, for example, a visual format, a style, a font, a text and/or a photographs format. By presenting the result items in the uniform and/or identical appearance, it becomes transparent to the user that the result items are offered by the third party trading websites rather than by the visited website. Maintaining the "look and feel" of the visited trading website when presenting result items offered by other websites may contribute to the successful purchasing session.

According to some embodiments of the present invention, there are provided methods and systems for creating a shared catalog. The shared catalog may be created by collecting inventory data listed in the local catalogs of the trading websites, either by accessing the local catalogs and/or by crawling the trading websites. In the shared catalog, each of the offered items is associated with item information which may include one or more characteristics of the item, for example, a type, a category, a color, a price, a delivery time, a payment term, a return policy, a liability policy and the like.

The offered items may be arranged for simple and/or efficient use by, for example, classifying the trading websites, categorizing the offered items, characterizing the online trading websites and the like. One or more search and/or analysis tools may be applied while searching a local catalog of each of the trading websites to efficiently identify and classify the offered items. Furthermore, the collected items' information may be semantically analyzed to better categorize the offered items including, for example, item description analysis, language translation, typos correction and the like. In addition, one or more classification and/or item matching rules may be derived from the semantic analysis.

The shared catalog may be a service hosted by a central hosting server or it may be distributed among a plurality of servers accessed in a peer-to-peer (P2P) methodology. Optionally, application programming interfaces (API) are used for connecting between the trading website and the shared catalog service for collecting the offered items information from the local catalogs of the trading websites as well as for intercepting the search request issued by the user at the visited trading website. Existing APIs of website hosting platforms such as, for example Magento and/or Shopify may be used to connect the trading website to the shared catalog service and/or a proprietary shared catalog API may be used.

The shared catalog may present significant advantages to the trading websites as the conversion rate for converting the potential buyer (user) to an actual buying client may significantly increase. The probability that the user finds the requested item(s) he is interested in may greatly increase by searching for availability of the requested item(s) in a plurality of trading websites rather than only in the visited trading website. By employing the powerful search and/or analysis tools, the shared catalog service may include a comprehensive inventory of offered items which may be unlimited with respect to geographical location, language, culture and the like. Using the shared catalog may greatly reduce the chance for receiving a "Null results" message which may be frequently encountered at currently existing online stores, even online stores which employ search engine(s).

Furthermore, the shared catalog service may be implemented using existing APIs allowing for easy and straight-forward transition and/or integration of the shared catalog service in the trading websites.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
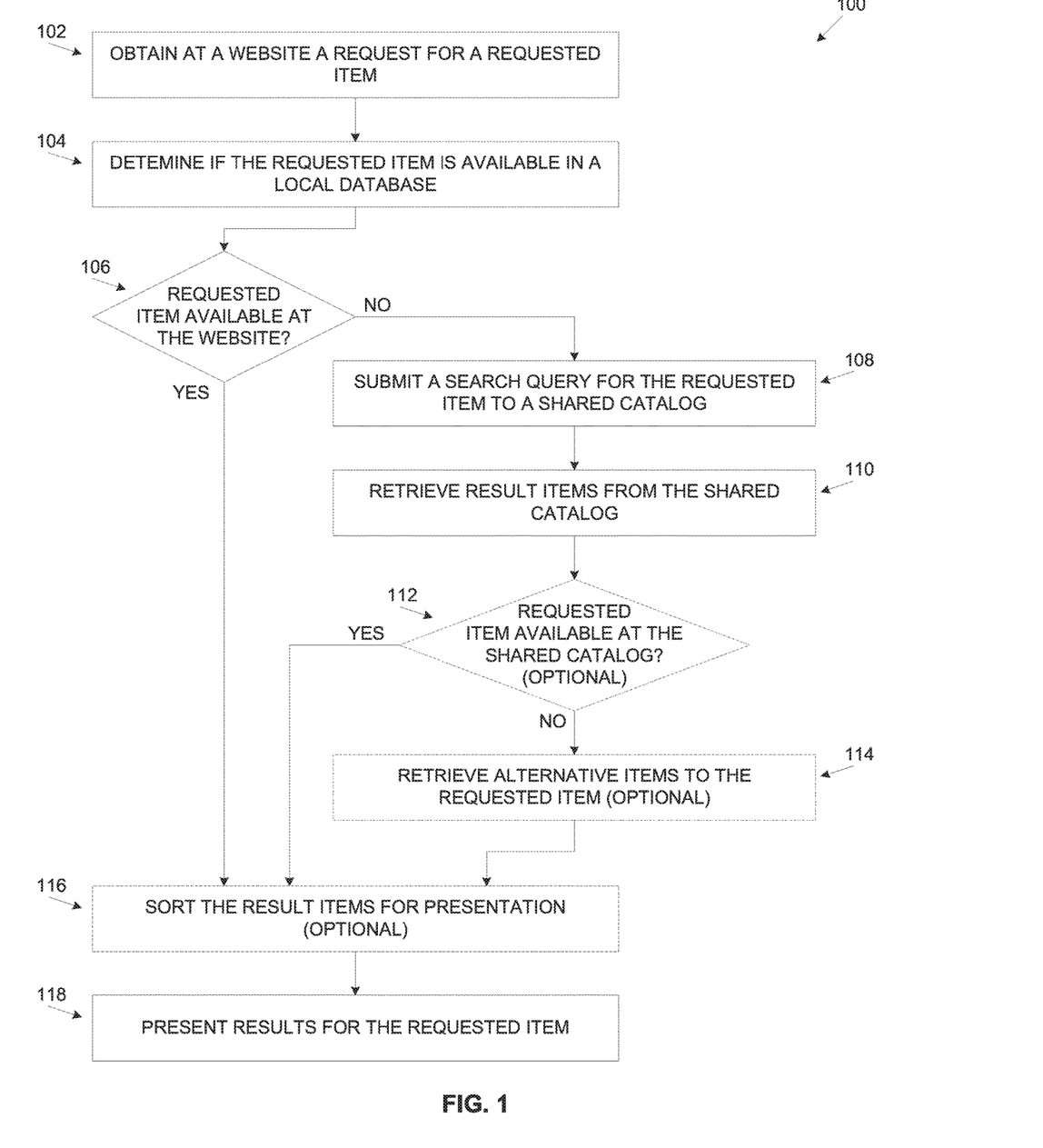
FIG. 1 is a flowchart of an exemplary process for enhancing a response to a query for an item at a website, according to some embodiments of the present invention.

Reference is now made to FIG. 1 which is a flowchart of an exemplary process for enhancing a response to a query for an item at a website, according to some embodiments of the present invention. A process 100 is executed for enhancing a response to a query for an item at an online trading website. The process 100 allows expanding a search for a requested item which is requested by a user (a potential buyer) visiting a trading website, using a trading application and/or visit a physical store having a local catalog listing the inventory of the store and is connected to a shared catalog service. The visited trading website may refer to the visited trading website, the used trading application and/or the visited physical store however, for brevity, these are all referred to herein as the visited trading website.

When the requested item is not available in an inventory of the visited trading website, the requested item may be searched for in a plurality of other trading websites using the shared catalog service. In case the requested item is found and is available by one or more of the other trading websites, the requested item may be presented to the user at the visited website as if it is offered by the visited website. Providing the requested item even when not available at the visited trading website may allow completing a successful purchasing of the requested item to the benefit of the user, the visited trading website and the providing trading website which provides the requested item. Following the completion of the purchasing session, the visited trading website and the providing trading website may share the revenues obtained through the successful purchasing session.

Figure 2:
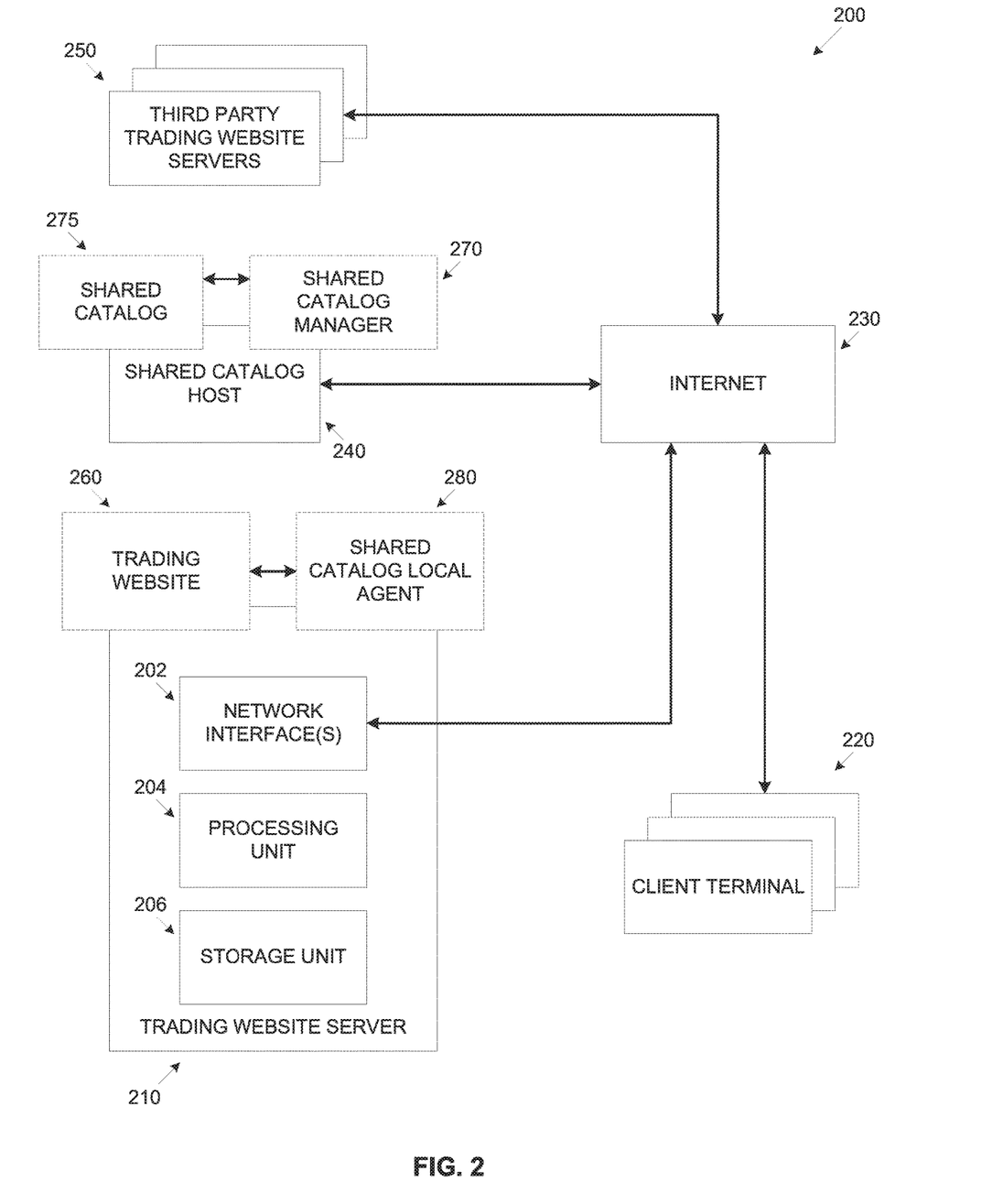
FIG. 2 is a schematic illustration of an exemplary system for enhancing a response to a query for an item at a website, according to some embodiments of the present invention.

Reference is also made to FIG. 2 which is a schematic illustration of an exemplary system for enhancing a response to a query for an item at a website, according to some embodiments of the present invention. A system 200 includes a visited website server 210 hosting an online trading website 260, one or more client terminals 220, a shared catalog host 240 and a one or more third party online trading website servers 250 such as the website server 210. The third party online trading websites 260 may also include one or more product feeds collaborating and/or unifying a plurality of online traders and/or trading websites 260. The website server 210, the client terminal(s) 220, the shared catalog host 240 and the third party trading website server(s) 250 are all connected to the Internet 230 to allow communication with each other. The website server 210 includes a network interface 202 for connecting to one or more networks to communicate over the Internet 230, a processing unit 204 a storage unit 206 for storing code.

The processing unit 204 may include one or more processors (homogenous or heterogeneous), which may be arranged for parallel processing, as clusters and/or as one or more multi core processing units. The processing unit 204 includes peripherals for executing code from the storage unit 206, for example, volatile memory arrays and the like. The storage unit 206 may include one or more non-transitory non-volatile memory devices, for example, a hard drive, a Flash array and the like. Optionally, the website server 210 comprises one or more processing nodes each comprising components such as the components of the website server 210. More optionally, the website server 210 is utilized by one or more cloud computing services hosted by one or more virtual servers, for example, Amazon elastic compute cloud (EC2), Microsoft Azure and the like. In addition, the website server 210 may be utilized as a cloud service, for example, software as a service (SaaS), platform as a service (PaaS) and the like.

Each of the website server 210 and/or the trading website servers 250 hosts a respective trading website 260 accessible from the Internet 230 to allow users to shop online. The trading website 260 may be implemented through one or more software modules, for example, an application, a utility, a process which may be executed by the processing unit 204 from the storage unit 206. Each trading website 260 comprises its own local catalog, for example, a database, a list, and array and the like which stores listings of the inventory of items available at the respective trading website. The local catalog may be stored in the storage unit 206 and/or it may be stored by one or more network storage unit, storage server and/or storage service accessible to the respective website server (210 and/or 250) over the Internet and/or over one or more networks.

The shared catalog host 240 may comprise one or more processing nodes each comprising components such as the components of the website server 210. More optionally, the shared catalog host 240 is utilized by one or more of the cloud computing services hosted by the one or more virtual servers. In addition, the shared catalog host 240 may be utilized as a cloud service, for example, software as a service (SaaS), platform as a service (PaaS) and the like. Optionally, the shared catalog host 240 is implemented as a distributed P2P service which is not centrally hosted but rather distributed among a plurality of hosts each providing part of the overall shared catalog.

The shared catalog service comprises three main elements. A shared catalog manager 270 which may include one or more software modules, for example, a plug-in, an application, a utility, a process and the like which are executed on the server 240. The shared catalog manager 270 is capable of accessing a shared catalog 275, for example, a database, a list, a data array and the like may be hosted by the shared catalog host 240 and/or it may be stored by one or more network storage unit, storage server and/or storage service accessible to the shared catalog host 240 over the Internet 230 and/or over one or more networks. The shared catalog manager 270 may communicate with a shared catalog local agent 280 which is deployed on each of the trading websites servers such as the website server 210 and the third part trading website servers 250. The shared catalog manager 270 may communicate with the local agents 280 over the Internet 230 and/or over one or more networks.

The shared catalog 275 comprises information and/or listings of a plurality of items, for example, commodities and/or services offered by one or more of the plurality of the trading websites 260. The information and/or listings may be collected by the shared catalog manager 270 from the trading websites 260 local catalogs. The items' information may include a plurality of characteristics associated with each of the items, for example, a type, a category, a color, a price, a delivery time, a payment term, a return policy, a liability policy and the like. The shared catalog 275 may be arranged and/or optimized for easy and fast navigation by classifying the offered items by, for example, a category and/or a class. The shared catalog manager 270 may apply one or more search and/or analysis tools while searching the local catalog of each of the online trading websites 260 to efficiently identify and classify the offered items. Furthermore, the collected items' information may be semantically analyzed to better categorize the offered items including, for example, analyzing the item description, translating the item information from a foreign language, correcting typos in the item information and the like. Following items' information arrangement and analysis, one or more classification and/or matching rules may be derived from the analyses.

The local agent 280 is deployed on each server such as the website server 210 and/or the trading website servers 250 to connect to the respective trading website 260. The local agent 280 may provide the communication channel between the trading website 260 and the shared catalog manager 270.

The local agent 280 may include one or more software modules, for example, a plug-in, an application, a utility, a process and the like which are executed on the website server 210 (and similarly on the trading website servers 250). The local agent 280 may connect to the trading website 260 using an existing API of a hosting platforms used for constructing the trading website 260, for example, Magento and/or Shopify. Optionally, the local agent 280 provides an API which may be used to connect the trading website 260 to the shared catalog manager 270. Using the API, the local agent 280 may easily connect to one or more internals of the trading website 260, for example, a local catalog, a database, a communication process, a client terminal interaction process and the like. Using the API, the local agent 280 may access the local catalog of each of the trading websites 260 to retrieve the offered items' information and transfer it to the shared catalog manager 270.

The client terminal(s) 220, for example, a computer, a tablet, a Smartphone and the like are used by users, i.e. potential buyers who browse the Internet 230 in search of one or more requested items which they are interested in. The client terminal(s) 220 may execute one or more browsing tools to allow the user to browse the Internet 230, for example, a web browser, an application, a utility, a service and the like. The browsing tool(s) executed on the client terminal(s) 220 may include and/or use one or more user interfaces of the client terminal(s) 220 to interact with the user, for example, a GUI presented on a screen, an audio session through a microphone/speaker, a text input/output through a keyboard/screen and the like.

As shown at 102, the process 100 starts with detecting and/or intercepting at the visited trading website 260 (hosted by the website server 210) a search request for information relating to one or more requested items. The search request may originate from the browsing tool at the client terminal 220 used by the user who is interested in the requested item(s). The search request may be detected and/or intercepted by the local agent 280 executed on the website server 210. The local agent 280 may use one or more of the API functions to come in between the search request received from the client terminal 220 and the local catalog of the trading website 260. The search request may be intercepted by the local agent 280 prior to submitting the search request to the local catalog of the visited trading website 260. Optionally, the local agent 280 may direct the search request to the local catalog of the visited trading website 260 to check availability of the requested item(s) at the visited trading website 260.

Additionally or alternatively, the local agent 280 may intercept one or more responses from the local catalog of the trading website 260 and analyze the response(s) to check availability of the requested item(s) at the trading website 260. The search request may include one or more filtering options for positive and/or negative filtering. For example, the search query may be defined to search for "tennis shoes" that are for "woman" and are not "red".

As shown at 104, the local agent 280 determines whether the requested item(s) is present, i.e. available, or absent, i.e. not available in the local catalog. This of course translates to determining whether the trading website 260 offers the requested item(s) and has it available or not.

As shown at 106 which is a decision point, in case the requested item(s) is available at the trading website 260, the process 100 branches to 116. In case the requested item(s) are not available at the trading website 260, the process 100 branches to 108.

As shown at 108, in case the requested item(s) are not available at the trading website 260, the local agent 280 initiates a search query for the requested item(s) to the shared catalog manager 270. Based on the search request, the plurality of offered items listed in the shared catalog is checked to identify one or more result items which correspond to the requested item(s). The result item(s) corresponding to the requested item(s) may indicate, for example, result item is the same as the requested item, result item is of the same category as the requested item, result item is of the same brand as the requested item and/or result item is a complementary item to the requested item.

The correspondence may be defined by one or more pre-defined rules which may be applied to the shared catalog manager 270. The search query is conducted by the shared catalog manager 270 which searches through the shared catalog 275. The shared catalog manager 270 may use the class of the visited trading website to refine the search. For example, the shared catalog manager 270 may restrict the search in the shared catalog 275 to items offered by third party trading websites 260 of the same class as the visited website 260. For example, in case the requested item is a "cat" and the visited trading website 260 is classified as a "pets" store, the search in the shared catalog 275 may be limited to items offered by third party trading websites which are also classified as pets related. The search in the shared 275 catalog may not search through items offered by third party trading websites which are also classified as "toys" related which may also offer items relating to "cat".

This may prevent irrelevant result items from being presented to the user. As another example, a class based keyword based on the class of the visited trading website 260 may be added to the search query when searching the shared catalog 275. For example, assuming the visited trading website 260 is classified as "dolls" related the shared catalog manager 270 may add the keyword "doll" the search query. Adding the keyword may lead to a more efficient and/or directed search through the shared catalog 275 thus providing more relevant and/or accurate result items.

Optionally, the local agent 280 directs the search query to one or more product feeds where the local agent 280 may search for the requested item(s) in the product feed(s) using the descriptive fields available for each item available in inventory of the product feed.

As shown at 110, the local agent 280 retrieves the result item(s) received from the shared catalog 270 in response to the search query.

Optionally, the local agent 280 injects the received result item(s) to the local catalog of the visited trading website 260. This may support presenting the result items to the user (step 118 herein after) in a visual format fully compliant with the visual appearance of the visited trading website 260 since the result item(s) are considered to originate from the local catalog and may therefore be presented as items available at the visited trading website 260.

Optionally, as shown at 112 which is another decision point, in case the list of result items is not empty, i.e. there are result item(s) which correspond to the requested item(s), the process 100 branches to 116. In case there are no result item(s) which correspond to the requested item(s) the process 100 branches to 114. As mentioned, the step 112 and the step 114 which follows are optional and may be bypassed such that the process 100 proceeds to step 116.

Optionally, as shown at 114, in case there are no result items, one or more alternative items may be suggested to the user (potential buyer). The alternative items may be retrieved from the local catalog of the trading website 260 and/or from the shared catalog 270. The alternative items may be selected according to pre-defined rules and directives which may be based on the type and/or attributes of the requested item(s) and/or the user. The alternative items may include for example, similar items of a different brand, items of the same category, items relating to the category and the like.

For example, in case the requested item is a diving watch of brand A and the requested diving watch is not found in the shared catalog, a diving watch of brand B may be offered and/or suggested to the user. As another example, in case the requested item was a golden earring which is categorized under "anniversary presents for women" and the requested golden earring is not found, a silver necklace which is also listed under anniversary presents for women" may be offered and/or suggested to the user. The alternative items may also be selected per one or more attributes of the user, for example, gender, age, geographical location and the like. The selection of the alternative items may also be adapted per the time of year, for example, seasons, holidays, festivities and the like.

Optionally, the alternative items are selected using a learning machine and/or a learning algorithm. The learning machine may evolve over time by collecting a plurality of purchasing sessions at the plurality of trading websites 260 and analyzing them. Analyzing the purchasing sessions may reveal which alternative items completed with successful purchases compared to which alternative items failed to lead to a successful purchase. The rate of successful and failed purchasing sessions may be further analyzed with respect to one or more parameters of each of the purchasing sessions, for example, the type of the requested item, the type of the alternative item, the attributes of the user and the like.

Optionally, as shown at 116, the result items may be sorted and/or filtered prior to presenting them to the user. The filtering and/or sorting may be done based on a matching score of each of the result item(s) compared to the requested item(s) with respect to one or more characteristics of the requested item(s) and/or the result item(s).

The matching score may be assigned by the shared catalog manager 270 analyzing the one or more characteristics of the result item(s) compared to the requested item(s), for example, a description, a type, a category, a price, a delivery time, a return policy and the like. For example, assuming the requested item is a pair of blue soccer boots by brand C. The result items may be arranged such that blue soccer boots by brand C are listed first (up the list), black soccer boots by brand C are listed second, blue soccer boots by brand D are listed third and so on. The result items may further be sorted and/or filtered by one or more another characteristics of the result items, for example, a delivery time where shortest delivery time result items are presented first (up the list) and longest delivery time result items are presented last (down the list). Moreover, result item(s) which are indicated to have a delivery time which exceeds a pre-defined threshold may be filtered out altogether and not presented to the user.

Furthermore, the result items may be sorted and/or filtered based on a ranking score assigned to each of the trading websites 260 based on, for example, contribution to the shared catalog, past transactions success rate and/or user's feedback. For example, in case two or more trading websites 260 offer the same requested item, the result item provided by a trading website 260 having a highest ranking score may be presented first while the result item provided by a trading website 260 having a lowest ranking score may be presented last. The sorting and/or filtering may be based on a combination of one or more characteristics of the result items.

Optionally, item pricing and/or revenue division may be negotiated between the visited website 260 and one or more third party trading websites 260 which offer the result item(s). The third party providing trading website 260 which provides one or more of the result items may request a certain percentage of the revenue which is collected during a successful purchasing session when the purchased item is the result item(s) provided by the providing trading website 260. The revenue division may be negotiated to reach an agreement with respect to the item pricing and/or the revenue division of the result item(s). The pricing and/or revenue division may affect the sorting and/or filtering of the result item(s) at the visited trading website 260. For example, the visited trading website 260 may be defined to set a maximum price for the requested item. Any result item which has a price exceeding the pre-defined maximum price may be filtered out of the result item list.

As another example, the result items from several providing trading websites 260 may be arranged in a top to down list according to the revenue division requested by each of the providing trading websites 260. For example, result items provided by providing trading websites 260 which demand a low percentage of the revenue may be listed first (top of the list) while result items provided by providing trading websites 260 which demand a high percentage of the revenue may be listed last (bottom of the list). Optionally, the pricing and/or revenue division may be negotiated dynamically in real-time between the visited website 260 and the providing trading websites 260. The real-time negotiation may be conducted by each side according to one or more pre-defined negotiation rules. The pre-defined negotiation rules may be based on one or more aspects of the result item and/or the providing trading website 260, for example, current average item price, availability of the requested item from other providing trading websites 260 and the likes.

As shown at 118, the result item(s) are presented to the user through the browsing tool executed on the client terminal 220. The browsing tool may present the trading website 260 to the user through, for example, a GUI. The presentation of the result item(s) may be adapted and/or manipulated to visually fit the visited trading website 260 such that it is transparent to the user whether the result item(s) originates from the visited trading website 260 (hosted by the server website 210) or from another trading website 260 (hosted by the servers 250). The presentation of the result item(s) may be converted to the visual format of the visited website 260, for example by using the API for connecting the local agent 280 to the trading website 260. Customizing the presentation of the result item(s) may include textual modifications, for example, language translation, currency conversion, item description manipulation and the like.

The customization of the presentation of the result item(s) may also include visual manipulation, for example, font, color, presentation visual format, photos adjustment and the like. The customization of the presentation of the result item(s) may further include currency conversion to fit the result item(s) pricing to the currency used at the visited trading website 260. In case the local agent 280 at the visited trading website 260 injected the result item(s) (and its respective information) to the local catalog of the visited trading website 260 the presentation is naturally identical to the presentation of items available in the local catalog.

After presenting the result item(s) to the user, the purchasing session may proceed exactly as any other purchasing session conducted by the visited trading website 260 regardless of the source of the result item(s)—the visited trading website 260 or one of the other trading websites 260. This makes the entire process of expanding the search for the requested item(s) (in case it is not available by the visited trading website 260) to additional trading websites 260 invisible to the user. Moreover, the probability of completing a successful purchase and converting the user to a buying client may significantly increase which is a win-win situation where both the user receives the items he is looking for and the trading website 260 concludes a sale.

Optionally, following a successful purchasing session, the visited trading website 260 may issue a purchase order for the purchased result item(s) to the trading website 260 that provided the purchased result item(s). The order may be placed automatically by the shared catalog service 270.

Optionally, following a successful purchasing session, the shared catalog service 270 arranges delivery of the purchased item(s) from the trading website 260 which provided the purchased item(s) to the visited trading website 260. This may be most relevant when the trading website 260 is a physical store in which the purchased item(s) are provided to the purchasing user at the location of the store.

Optionally, in case the requested item is not available at the visited trading website 260 and/or at the third party trading websites 260, an order for a future delivery may be received from the user. The local agent 280 at the visited trading website 260 may suggest the user to place an order for a future delivery, for example, a day later, a week later and the like. In case the user accepts and places an order, the requested item may be ordered, for example, from a storage facility, a manufacturer, a supplier, an importer and the like.

Figure 3:
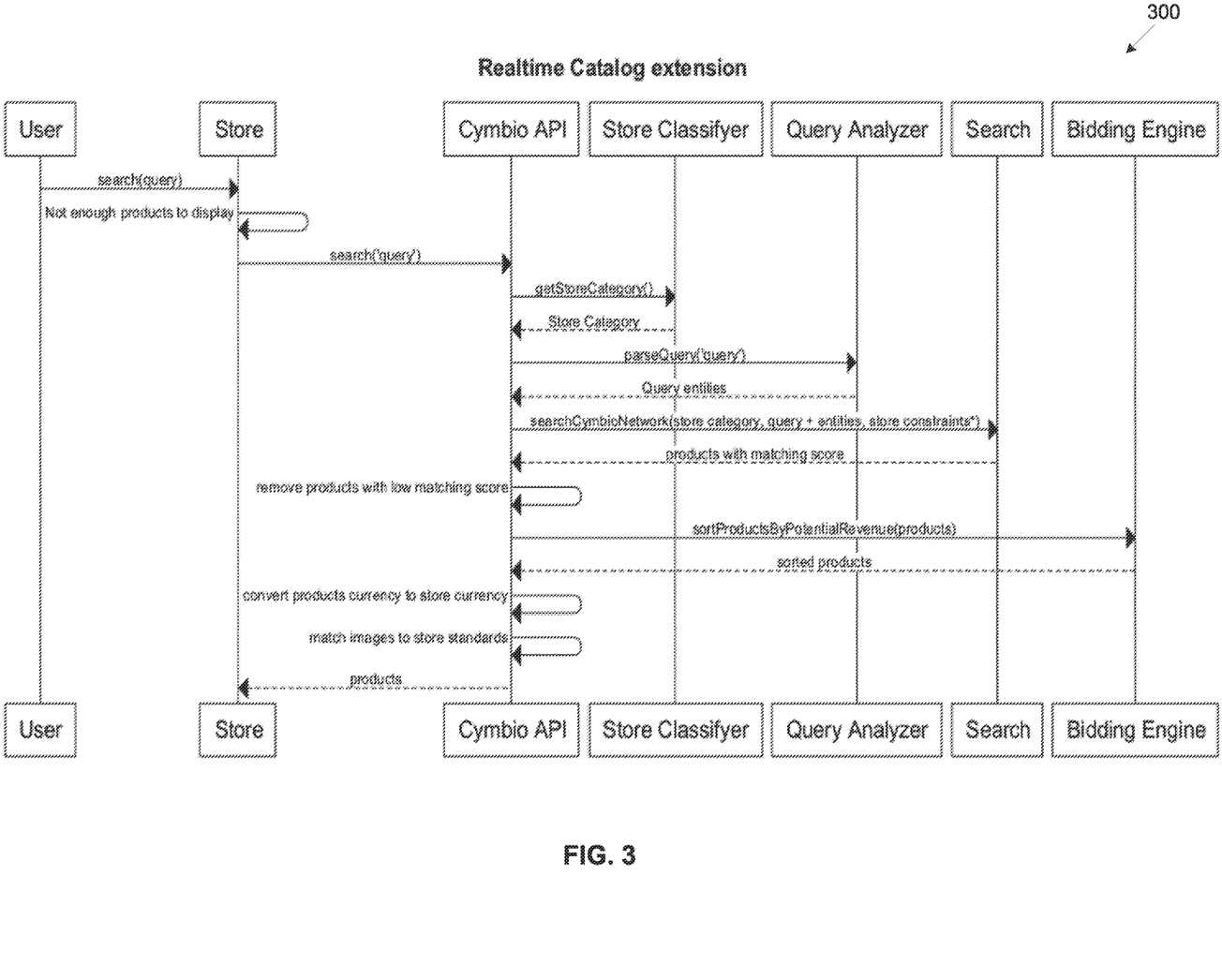
FIG. 3 is a schematic illustration of an exemplary purchasing session using a shared catalog service, according to some embodiments of the present invention.

Reference is now made to FIG. 3 which is a schematic illustration of an exemplary purchasing session using a shared catalog service, according to some embodiments of the present invention. A purchasing session 300 follows a process such as the process 100. The purchasing session 300 starts with a user using a client terminal such as the client terminal 220 visits a trading website such as the trading website 260.

Through a browsing tool executed at the client terminal 220, the user issues a search request (query) for a requested item(s). When the requested item(s) is offered and available at the website 260 the purchasing session proceeds as a regular session handled by the visited trading website 260. When the requested item(s) is not available by the visited trading website 260 and/or there are not enough items to present several options to the user, the search query is forwarded to a shared catalog service such as the shared catalog manager 270. The user initiated search request may be detected and/or intercepted by a local agent such as the local agent 280 which connects to the trading website 260 through, for example, an API. The local agent 280 forwards the search query to the shared catalog manager 270 which may process the search query in one or more steps.

A first step may be evaluating the classification of the visited trading website 260 to identify the class and/or category of the visited trading website 260. Identifying the class and/or category of the visited trading web site 260 may allow the shared catalog manager 270 to refine the search for the requested item(s) in the shared catalog.

The next step may be analyzing the search query to identify one or more characteristics of the requested item(s), for example, type, category, attribute(s), target price, desired delivery time and the like. The analysis of the search query may be used to extract one or more search terms which may be used for searching the shared catalog.

After defining the search term(s), the shared catalog manager 270 may initiate a search in the shared catalog using the search term(s). The shared catalog manager 270 may apply one or more constraints to the search, for example, a certain geographical location, a pre-defined delivery time, a maximum price and the like. The shared catalog manager 270 retrieves one or more result items which comply with the search terms and constraints (if exist). The result item(s) may be each assigned a matching score to express how much the result item(s) fits the search query initiated to the shared catalog.

The result items may be subject to negotiation between the visited trading website 260 and one or more of the providing trading websites 260 which provide the result item(s). The negotiation may relate to, for example, the item price of the result item(s) and/or the revenue division between the visited trading website 260 and the providing trading website 260 in case of a successful purchasing transaction. The item price and/or the revenue division may be used by the visited trading website 260 to sort and/or to filter the result item(s) presented to the user.

Once the result item(s) are received by the local agent 280, they are presented to the user through the client terminal 220 as described in step 118.

According to some embodiments of the present invention, there are provided methods and systems for creating and maintaining a shared catalog service comprising a shared catalog such as the shared catalog 275.

Figure 4:
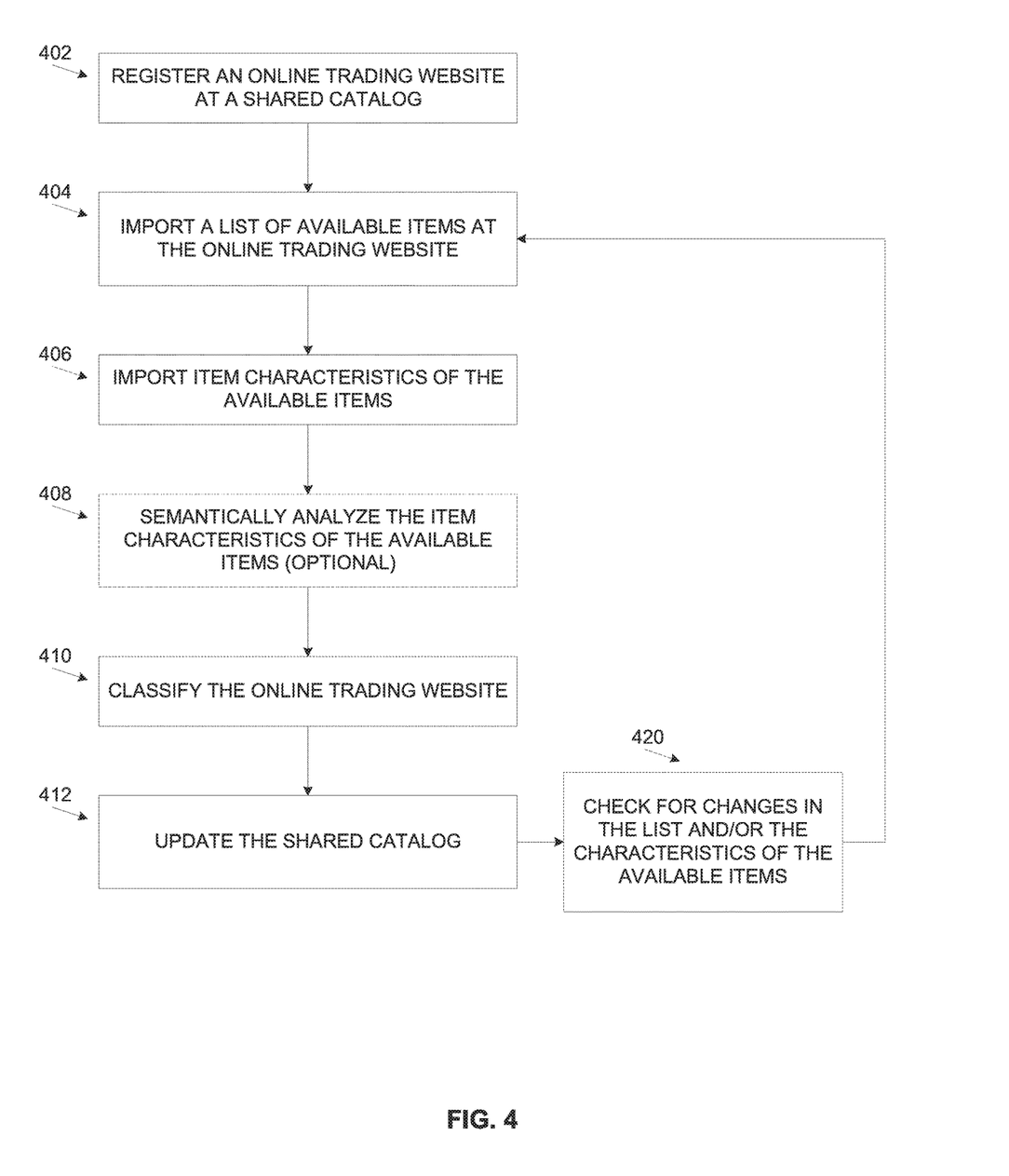
FIG. 4 is a flowchart of an exemplary process for constructing a shared catalog, according to some embodiments of the present invention.

Reference is also made to FIG. 4 which is a flowchart of an exemplary process for constructing a shared catalog, according to some embodiments of the present invention. A process 400 for creating a shared catalog may be performed by a shared catalog service such as the shared catalog manager 270 coupled with a plurality of instances of shared catalog local agent such as the local agent 280 each deployed in one of a plurality of online trading websites such as the trading websites 260. The process 400 is repeated for each of the trading websites 260 such that the shared catalog comprises products offered by each of the trading websites 260.

As shown at 402, the process 400 starts with registering one of a plurality of trading websites 260 to the shared catalog manager 270. The registration may be done using the local agent 280 which attaches and/or integrates with the trading website 260 through the API. The API may be the API of the trading website 260 and/or the API may be provided by the local agent 280. The registration may include retrieving a plurality of characteristics of the trading website, for example, a name, a uniform resource location (URL), a language, a currency, contact details, a class, a category, a market segment, a geographical location, a sale policy, a sale rule, a liability policy, a return policy and the like.

As shown at 404, using the local agent 280, a listing of the offered items available at the trading website 260 is extracted and forwarded to the shared catalog manager 270.

As shown at 406, information of the offered products is extracted. The offered items' information may include one or more characteristics of each of the offered items, for example, description, type, category, price and the like. The offered items information may be used by the shared catalog manager 270 to properly classify each of the offered items to allow for efficient and/or accurate matching of the offered items to requested items which may be searched for by one or more users.

Optionally, as shown at 408, the shared catalog manager 270 may conduct a semantic analysis to the extracted information to better classify each of the offered items. The semantic analysis may include, for example, language translation, typos correction, item description and/or title adjustment and the like. The semantic analysis may serve to align the information of the offered items which may be available from a plurality of trading websites which may each have a different information method and/or system.

As shown at 410, the trading website 260 is classified to one of a plurality of item categories based on the items offered by the trading website 260. Optionally and/or additionally, the trading website 260 is classified according to information retrieved from the trading website 260, for example, a name, a metadata, a website text and the likes. The item categories may include, for example, "clothing", "shoes", "electrical appliance", "computer products", "insurance services", "traveling services" and the like. The classification may also relate to the type of the trading website 260, for example, an independent trading website 260 and/or a product feed comprising a plurality of trading websites 260. A category of the product feed may also be classified, for example, "hotels feed", "shoes feed", "electrical appliance feed" and the like. The classification may also include the type of API used by the trading website 260, for example, an API of a hosting platform such as Magento and/or Shopify and/or the API of the product feed, for example, Amazon. The classification of the trading website 260 may have a major impact on the way the shared catalog manger 270 handles search queries from each trading website as well. The classification of the trading website 260 may also affect the way the shared catalog manger 270 searches for results items in response to the search query. For example, the shared catalog manger 270 may receive a search query for a requested item comprising the term "Italy" from a local agent 280 deployed at a trading website 260 which is classified under a class "books". The shared catalog manger 270 may not search the shared catalog 275 for items offered by trading websites 260 which are classified under a class "traveling services". This may prevent providing irrelevant and/or inaccurate result items since the trading websites 260 classified for "traveling services" are likely to offer result items comprising the keyword "Italy" however the user is probably looking for a book and/or a map.

As shown at 412, the shared catalog manager 270 updates the shared catalog with the items (and respective information) offered by the registering trading website 260.

As shown at 420, the shared catalog may be updated with changes to the offered items at the trading websites 260. Whenever a change is made to one or more of the offered items at one or more of the trading websites, the shared catalog may be updated accordingly by branching to step 404. The changes may include for example, adding an offered item, removing an offered item and/or changing one or more of an existing offered item characteristics. The changes may be detected by accessing the trading websites 260 and/or by crawling the trading websites 260. The changes may be detected by the shared catalog manager 270 during a periodic scan which may take place, for example, twice a day, once a day, three times a week, once a week and/or once a month. In case a change is detected the shared catalog manager 270 may updated the shared catalog accordingly.

Optionally, the changes to the offered item(s) may be detected locally by the local agent 280 at each of the trading websites 260. Whenever a change is applied to the offered item(s) at the trading website 260, the local agent 280 (which connects to the trading website 260 through the API) may detect the change and report it to the shared catalog manager 270. The shared catalog manager 270 may then update the shared catalog with the changed information.

Figure 5:
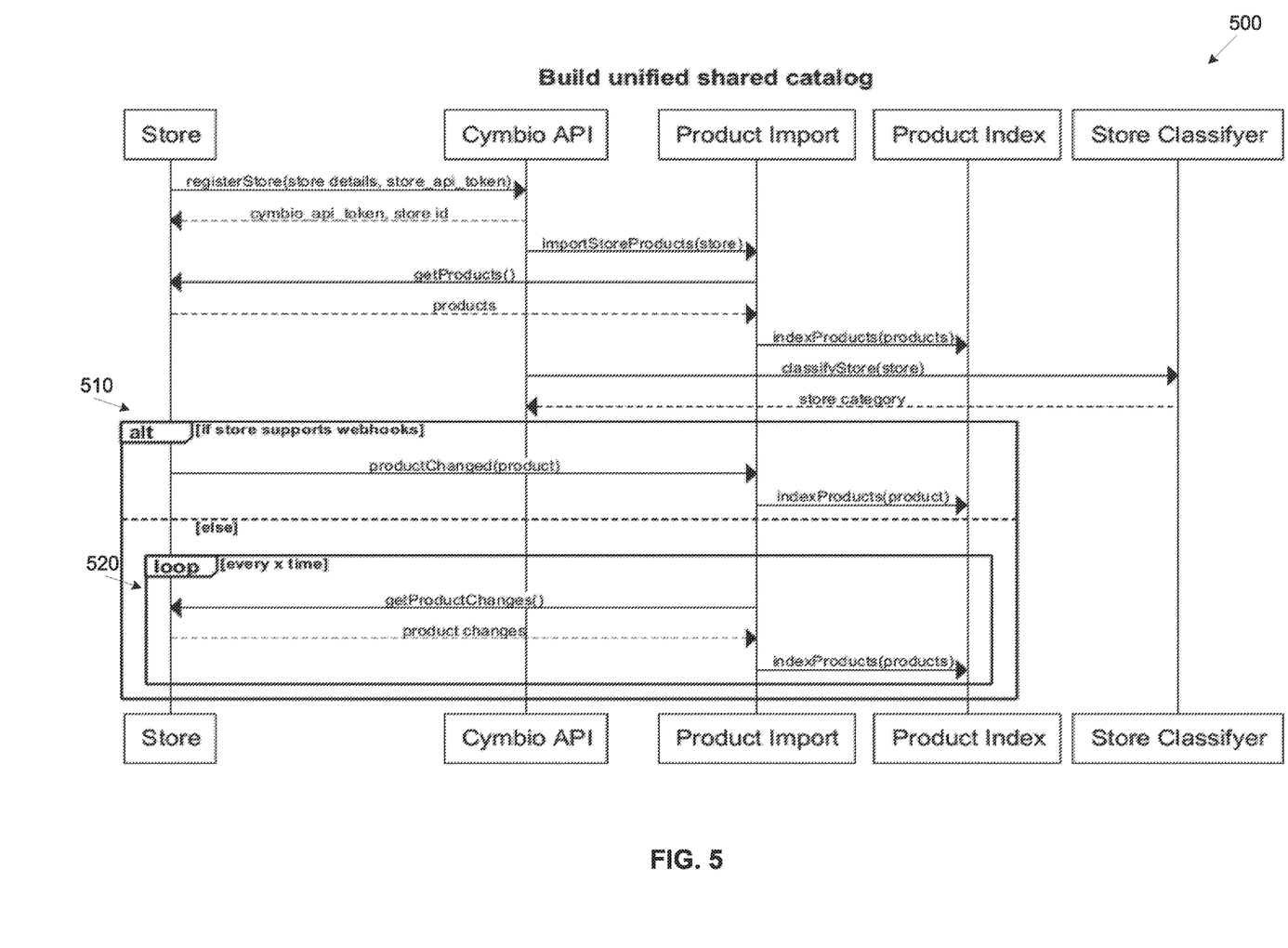
FIG. 5 is a schematic illustration of an exemplary sequence of constructing a shared catalog, according to some embodiments of the present invention.

Reference is now made to FIG. 5 which is a schematic illustration of an exemplary sequence of constructing a shared catalog, according to some embodiments of the present invention. A shared catalog construction sequence 500 follows a process such as the process 400. The construction sequence 500 starts with registering a trading website such as the trading website 260 to a shared catalog service such as the shared catalog manager 270. The construction sequence 500 is repeated for each of the trading websites 260 such that the shared catalog comprises products offered by each of the trading websites 260. The interaction between the shared catalog manager 270 and each of the trading websites 260 is done through a shared catalog local agent such as the local agent 280 which may be deployed in each of the trading websites 260. The local agent 280 is attached to the trading website 260 using an API. The API may be a custom and/or a proprietary API. Optionally, as shown at the alternate section 510, when the trading website 260 is constructed using a hosting platform, for example, Magneto, Shopify and the like the local agent 280 may connect to the trading website 260 using the hosting platform API.

The remaining of the construction sequence 500 follows the process 400 including the update of the shared catalog following a change in one of the offered items in one of the trading websites 260 as shown at the loop section 520.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of increasing searching capabilities for enhancing a response to a query for an item at a website, comprising:
   obtaining, at a server hosting a visited website, a request from a client terminal for retrieving information of a requested item;
   detecting a presence or an absence of said requested item in a local catalog of said visited website;

presenting, in case of said presence, a first presentation of said requested item at a graphical user interface displayed on a display of said client terminal;

increasing searching capabilities of said server, in case of said absence, by issuing a search query for said requested item in a shared catalog comprising a plurality of offered items available from at least one another website, said search query is directed to a sub group of said at least one another website, identified according to a classification of said visited website;

receiving a response from said shared catalog, said response comprises at least one result item from said plurality of offered items which corresponds to said requested item, which is absent from said local catalog; and presenting a second presentation of said at least one result item at said graphical user interface, said first presentation and said second presentation share a common visual format such that for a user, presenting said second presentation instead of said first presentation is a transparent process.

2. The computer implemented method of claim 1, wherein said visited website is a member selected from a group comprising: a trading website accessible in the internet, a trading application executed at said client terminal and a physical store having an online local catalog accessible to said shared catalog.

3. The computer implemented method of claim 1, wherein said obtaining of said request includes intercepting said request prior to reaching said local catalog.

4. The computer implemented method of claim 1, wherein said obtaining of said request includes intercepting a response from said local catalog to said request.

5. The computer implemented method of claim 1, wherein said search query is directed to retrieve said at least one result item from a subset said plurality of offered items, said subset includes offered items which are offered by at least one another website which is of a class similar to said class of said visited website.

6. The computer implemented method of claim 1, further comprising issuing said search query to at least one product feed.

7. The computer implemented method of claim 1, wherein said at least one result item is injected into said local catalog.

8. The computer implemented method of claim 1, further comprising negotiating over at least one attribute of said at least one result item with at least one another website providing said at least one result item, said at least one attribute is a member selected from a group comprising, item price and revenue division percentage.

9. The computer implemented method of claim 1, wherein said presentation of said at least one result item includes at least one characteristic of said at least one result item, said at least one characteristic is a member selected from a group consisting of: a description, a type, a category, an attribute, a price, an availability, a delivery term, a return policy and a warranty term.

10. The computer implemented method of claim 1, further comprising sorting said at least one result item for said presentation, said sorting expresses a relevancy order of said at least one result item compared to said requested item.

11. The computer implemented method of claim 10, wherein said sorting is based on a match score assigned to each of said at least one result item by analyzing a description of said each result item compared to a description of said requested item.

12. The computer implemented method of claim 10, wherein said sorting is based on a product ranking assigned to each of said at least one result item according to at least one characteristic of said each result item.

13. The computer implemented method of claim 10, wherein said sorting is based on a trader ranking assigned to each of a plurality of websites offering said at least one result item.

14. The computer implemented method of claim 1, further comprising said presentation includes at least one alternative item to said requested item.

15. The computer implemented method of claim 1, wherein said issuing said search query in said shared catalog comprising adding to said search query a class based keyword based on said classification of said visited website.

16. A system of increasing searching capabilities for enhancing a response to a query for an item at a website, comprising:

a program store storing a code;

at least one processor at a server hosting a visited website coupled to said program store for executing said stored code, said code comprising:

code instructions to obtain a request from a client terminal for retrieving information of a requested item;

code instructions to detect a presence or an absence of said requested item in a local catalog of said visited website;

code instructions to present, in case of said presence, a first presentation of said requested item at a graphical user interface displayed on a display of said client terminal;

code instructions to increase searching capabilities of said at least one processor, in case of said absence, by issuing a search query for said requested item in a shared catalog comprising a plurality of offered items available from at least one another website, said search query is directed to a sub group of said at least one another website, identified according to a classification of said visited website;

code instructions to receive a response from said shared catalog, said response comprises at least one result item from said plurality of offered items which corresponds to said requested item, which is absent from said local catalog; and code instructions to present a second presentation of said at least one result item at said graphical user interface, said first presentation and said second presentation share a common visual format such that for a user, presenting said second presentation instead of said first presentation is a transparent process.

17. The system of claim 16, wherein said shared catalog is hosted by a server accessible by said server hosting said visited website over the Internet.

18. The system of claim 16, wherein said shared catalog is distributed among a plurality of hosts accessible by said server hosting said visited website over the Internet.

19. A computer implemented method of constructing a shared catalog, comprising:

registering each of a plurality of websites at a shared catalog service;

importing a list of a plurality of available items offered by each of said plurality of websites;

importing at least one characteristic of each of said plurality of available items;

classifying said each website in one of a plurality of trading categories; and updating said shared catalog with said list of available items, said at least one characteristic of each of said plurality of available items and said trading category of each of said plurality of websites.

20. The computer implemented method of claim 19, further comprising performing a semantic analysis to extract at least one semantic attribute of at least some of said plurality of available items.

21. The computer implemented method of claim 19, further comprising updating said shared catalog following a change detected in at least one of said plurality of websites, said change includes at least one of: an update to said list and an update to said at least one characteristic.

* * * * *